UNITED STATES PATENT OFFICE.

HENRY FLEISCHMANN, OF NEW YORK, N. Y.

IMPROVEMENT IN THE MANUFACTURE OF YEAST.

Specification forming part of Letters Patent No. 102,387, dated April 26, 1870.

*To all whom it may concern:*

Be it known that I, HENRY FLEISCHMANN, of New York city, in the county of New York and State of New York, have invented certain new and useful Improvements in Crompressed Yeast; and I do hereby declare that the following is a full and exact description thereof.

The nature of my invention consists in producing, from the fermenting mash used in the manufacture of malt and spirituous liquors, a yeast suitable for baking, and for other purposes.

Having thus described the nature of my invention, and to enable manufacturers and others skilled in the art to make and use the same, I will now proceed to explain in what manner it may best be carried into effect.

I mix corn and rye together, in the proportion of seventy parts corn to thirty of rye, adding thereto four parts rye malt and two of barley malt. To the above-named ingredients I add water at a temperature of 190° Fahrenheit, stirring the mass until it falls to a temperature of 150° Fahrenheit, and ceases to precipitate a floury or creamy sediment. The mash is then covered, allowing it to remain under water for twenty-four hours, when it is again thoroughly stirred and brought to a temperature of 60° to 62° Fahrenheit, in the winter, or 44° to 46° Fahrenheit in the summer, months. Brewer's yeast is then added, (to start a fermentation) also, crystallized soda and chloride of sodium.

The whole of the ingredients should now be thoroughly stirred, and the vessel which contains them closed with a cover having an aperture for the escape of the carbonic-acid gas generated during the process of fermentation. The ingredients are left thus for two hours, or until the temperature is increased some 20° Fahrenheit, when a portion of the mash is separated and set aside, which forms mother-yeast to be used in the place of brewer's yeast employed in the first preparation of the mash. The mash should now be placed in a cylinder or tun, a vacant place of some two or three feet being left above its surface.

After a lapse of four hours, bubbles commence to form in large quantities, and, rising to the surface, coalesce, their aggregation constituting a heavy froth, which continues to collect for twelve hours, rising higher in the vacant portion of the tun as its volume increases. This froth must be removed when it has reached its maximum of quantity or formation, and immersed in cold water for six hours, when the water is drawn off, the yellow residuum being inclosed in a silk bag and strained (to free it from all husks and other extraneous matters) into a suitable vessel, where it is kept for twelve hours, after which more of the water is removed; and the substance is washed in this manner until the water taken from it ceases to flow off with a milky hue. The substance, after being so treated, is inclosed in a cotton bag and submitted to hydraulic or other pressure, by which means any remaining moisture is thoroughly expressed, and the material thus prepared forms my compressed yeast.

What I claim as new in the process described above, and desire to secure by Letters Patent, is—

1. A compressed yeast, suitable for baking and other purposes, prepared from the froth or scum formed during the fermentation of mash used for the manufacture of malt or spirituous liquors, as herein set forth.

2. The process, substantially as described above, of making yeast from the mash used in the manufacture of malt and spirituous liquors.

HENRY FLEISCHMANN.

Witnesses:
SIM H. MERRILL,
S. R. KILLY.